United States Patent
Maier et al.

(10) Patent No.: US 12,166,385 B2
(45) Date of Patent: Dec. 10, 2024

(54) ELECTRICALLY EXCITED MACHINE AND CONTACTLESS ARRANGEMENT FOR AN ELECTRICALLY EXCITED MACHINE

(71) Applicant: MAHLE International GmbH, Stuttgart (DE)

(72) Inventors: David Maier, Bühl (DE); Samuel Müller, Herrenberg (DE); Nejila Parspour, Gerlingen (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 0 days.

(21) Appl. No.: 17/339,635

(22) Filed: Jun. 4, 2021

(65) Prior Publication Data

US 2022/0060088 A1 Feb. 24, 2022

(30) Foreign Application Priority Data

Jun. 4, 2020 (DE) ...................... 10 2020 207 000.8

(51) Int. Cl.
  *H02K 5/20* (2006.01)
  *H02J 50/10* (2016.01)
  (Continued)

(52) U.S. Cl.
  CPC .............. *H02K 11/00* (2013.01); *H02J 50/10* (2016.02); *H02K 3/04* (2013.01); *H02K 5/20* (2013.01);
  (Continued)

(58) Field of Classification Search
  CPC . H02K 11/00; H02K 3/04; H02K 5/20; H02K 7/003; H02K 9/00; H02K 11/30;
  (Continued)

(56) References Cited

U.S. PATENT DOCUMENTS 3,614,593 A 10/1971 Lace
4,647,806 A 3/1987 Giuffrida
(Continued)

FOREIGN PATENT DOCUMENTS

CA 2171700 A1 9/1996
CN 110635576 A 12/2019
(Continued)

OTHER PUBLICATIONS

Non-Final Office Action dated May 4, 2023 in U.S. Appl. No. 17/339,612, 14 pages.
(Continued)

*Primary Examiner* — Terrance L Kenerly
*Assistant Examiner* — Viswanathan Subramanian
(74) *Attorney, Agent, or Firm* — Shook, Hardy & Bacon L.L.P.

(57) ABSTRACT

An electrically excited machine that includes a machine rotor and an exciter device for the electrical excitation of the electrically excited machine. The exciter device can include at least one energy transfer system integrated in and/or arranged inside the machine rotor. The machine rotor can include a rotor winding. The electrically excited machine can also include a machine stator. The machine stator can be arranged outside of the electrically excited machine.

17 Claims, 8 Drawing Sheets

(51) Int. Cl.
*H02K 3/04* (2006.01)
*H02K 7/00* (2006.01)
*H02K 9/00* (2006.01)
*H02K 11/00* (2016.01)
*H02K 11/30* (2016.01)
*H02K 19/00* (2006.01)

(52) U.S. Cl.
CPC ............... *H02K 7/003* (2013.01); *H02K 9/00* (2013.01); *H02K 11/30* (2016.01); *H02K 19/00* (2013.01)

(58) Field of Classification Search
CPC ............. H02K 11/012; H02K 11/0141; H02K 11/042; H02K 19/12; H02K 19/36; H02K 19/16; H02J 50/10; H02J 50/005; H02J 50/70
See application file for complete search history.

(56) References Cited

U.S. PATENT DOCUMENTS

| | | | |
|---|---|---|---|
| 5,519,275 A * | 5/1996 | Scott | ................. H02K 11/0094 310/216.057 |
| 6,333,581 B1 | 12/2001 | Kohl et al. | |
| 8,052,860 B1 | 11/2011 | Engelhaupt et al. | |
| 2005/0218740 A1 | 10/2005 | Stout et al. | |
| 2009/0273251 A1 | 11/2009 | Cordes et al. | |
| 2010/0295397 A1 | 11/2010 | Dowis et al. | |
| 2015/0203197 A1* | 7/2015 | Bajekal | ................... B64C 27/32 416/61 |
| 2019/0058382 A1 | 2/2019 | Gao et al. | |

FOREIGN PATENT DOCUMENTS

| | | |
|---|---|---|
| DE | 2122520 A1 | 11/1971 |
| DE | 2234472 A1 | 1/1974 |
| DE | 2509002 A1 | 7/1976 |
| DE | 4333094 A1 | 3/1995 |
| DE | 19509264 A1 | 9/1996 |
| DE | 19935074 A1 | 2/2000 |
| DE | 202 04 584 U1 | 8/2003 |
| DE | 10 2017 214 766 A1 | 4/2018 |
| DE | 10 2019 212 406 A1 | 2/2021 |
| EP | 3 331 128 A1 | 6/2018 |
| GB | 2378586 A | 12/2003 |
| JP | S62 78 072 U | 5/1987 |
| WO | 95/26069 A1 | 9/1995 |
| WO | 03/081615 A1 | 10/2003 |
| WO | 2006/037972 A1 | 4/2006 |
| WO | 2013/084164 A2 | 6/2013 |
| WO | 2018/067148 A1 | 4/2018 |
| WO | 2019/038080 A1 | 2/2019 |
| WO | 2021/032705 A1 | 2/2021 |

OTHER PUBLICATIONS

Notice of Allowance dated Aug. 30, 2023 in U.S. Appl. No. 17/339,612, 7 pages.

* cited by examiner

ELECTRICALLY EXCITED MACHINE AND CONTACTLESS ARRANGEMENT FOR AN ELECTRICALLY EXCITED MACHINE

This non-provisional patent application claims priority to German Patent Application No. 10 2020 207 000.8, filed Jun. 4, 2020, and titled "Elektrisch erregte Maschine und Anordnung für eine elektrisch erregte Maschine," the entire contents of which is incorporated herein by reference.

The invention relates to an arrangement for an electrically excited machine and to an electrically excited machine, in particular an electrically excited synchronous machine.

The synchronous machine is established in particular in the field of traction drives due to its high torque and power density. For example, permanent-magnetically synchronous machines are characterized by a compact design and high performance. However, this compact design has to be assured by means of expensive rare earths, which are required for the production of high-energy permanent magnets. In addition, the permanent rotor field has a disadvantageous effect in terms of efficiency at high rotational speeds or high speeds, since the magnetic field has to be weakened actively. An alternative to the permanent-magnetically excited rotor field is the electrically excited synchronous machine (EESM), which does not require any permanent magnets and can therefore be manufactured at lower costs. In addition to the cost advantage, the EESM usually also offers increased safety compared to a permanent-magnetically excited synchronous machine, since the rotor excitation can be switched off and no voltage is induced in case of failure.

To generate a magnetic field on the rotor of an electrically excited synchronous machine, it is necessary to transfer electrical energy to the rotor or to an exciter winding of the rotor of the electrically excited synchronous machine. To this end, the rotor of the electrically excited synchronous machine can be supplied by a DC voltage source via slip rings or via additional rotating transformers and rectifiers.

Conventionally, the additionally required energy transfer system is usually attached laterally to the active part of the synchronous machine in the axial direction, which increases the installation space in the axial direction. The additional energy transfer system required for the energy transfer, i.e. a slip ring system or a contactless energy transfer system (CET system), thus leads to a less compact design compared to a permanent-magnetically excited synchronous machine. For many applications, e.g. in the field of electromobility, a compact design, especially in the axial direction, is of great importance. Precisely the installation space required in addition to the synchronous machine should be as small as possible in order not to reduce the power density by the energy transfer system compared to permanent-magnetically excited synchronous machines, for example.

It is therefore an object of the present invention to provide an arrangement for realizing an electrically excited machine that is as compact as possible (in particular an electrically excited synchronous machine). In addition, it is an object of the present invention to provide a compact, electrically excited synchronous machine. These objects are achieved by the subject matters of the independent claims. Advantageous embodiments are the subject of the subclaims.

A first independent aspect for achieving the object relates to an arrangement for an electrically excited machine, the arrangement comprising the following:
a machine rotor; and
an exciter device for the electrical excitation of the machine, in particular the machine rotor, wherein the exciter device comprises at least one energy transfer system configured for the contactless transfer of electrical energy and integrated in the machine rotor.

In particular, the invention relates to an arrangement for an electrically excited machine, the arrangement comprising the following:
a machine rotor; and
an exciter device for the electrical excitation of the machine, in particular the machine rotor, wherein the exciter device comprises at least one energy transfer system integrated in the machine rotor.

An "energy transfer system" in the context of the invention is in particular not understood to mean a generator or motor, but rather a device with which electrical energy is converted into electrical energy. Thus, in the context of the invention, "energy transfer system" is understood to mean in particular a device for the transfer of electrical energy (into electrical energy), which itself cannot perform any mechanical work and/or cannot generate any torque. In addition, the function of the energy transfer system described in the context of the invention is independent of the operation of the electrically excited machine, in particular of its speed or rotational frequency. Operation is therefore possible both when the machine is at a standstill and when the machine is in clockwise or counterclockwise rotation.

In particular, the (contactless) energy transfer system can replace a conventional slip ring system for an electrically excited machine (e.g. a synchronous machine), which is used to excite a machine rotor. Similar to the slip ring, the energy transfer system can be used to energize or excite a rotor winding of the machine.

The arrangement is particularly suitable for realizing or manufacturing an electrically excited synchronous machine or can be used for realizing or manufacturing an electrically excited synchronous machine. However, the arrangement can also be suitable for other electrically excited machines, such as e.g. a transverse flux machine. In particular, the arrangement can become or be a part of an electrically excited synchronous machine or a transverse flux machine.

A "machine rotor" is understood to mean in particular a rotor of an electrically excited machine or a rotor for an electrically excited machine. In other words, a machine rotor is a rotor that is suitable for an electrical machine, can be used for an electrical machine and/or is provided for an electrical machine. In the EESM, the magnetic rotor field is at least partially (e.g. in combination with a permanent magnet) or completely generated by an electric current.

The "exciter device" is particularly suitable for the electrical excitation of the machine rotor. In particular, energy from an energy source can be transferred to the machine rotor by the exciter device. In the context of this description, "excitation" is understood to mean in particular the supply of an exciter winding or exciter coil with electric current and/or the generation of a magnetic field on the rotor (as a result of the current supplied).

In particular, the at least one energy transfer system is a contactless or wireless, for example an inductive or capacitive, energy transfer system.

The at least one energy transfer system is integrated in the machine rotor. In other words, the at least one energy transfer system is arranged in the machine rotor. In particular, the at least one energy transfer system is arranged inside or in the interior of the machine rotor.

By integrating the at least one energy transfer system in the machine rotor, additional installation space, as is required in conventional electrically excited machines, can be reduced or avoided. In this way, an extremely compact electrically excited machine can be realized or provided.

The energy transfer system in particular has a rotor winding or rotor coil and a stator winding or stator coil. The rotor coil and stator coil are in particular arranged to be rotatable with respect to one another. In particular, the rotor coil and stator coil are arranged relative to one another such that no current is induced when the coils rotate relative to one another. In principle, both the rotor coil and the stator coil of the energy transfer system can each be a primary coil or a secondary coil. Preferably, however, the stator coil of the energy transfer system is a primary coil, while the rotor coil of the energy transfer system is a secondary coil. In order to generate current in the secondary coil, an AC voltage is applied to the primary coil. A relative rotation between the primary coil and the secondary coil is not necessary though. In particular, the primary and secondary coils can be cylindrical and/or arranged cylindrically with respect to one another.

In a preferred embodiment, the machine rotor has a machine rotor shaft or rotor drive shaft and the at least one energy transfer system of the exciter device is arranged in a cavity of the machine rotor shaft. The machine rotor shaft is therefore designed as a hollow shaft. In other words, the machine rotor shaft is hollow.

In a further preferred embodiment, the machine rotor shaft has at least one cable bushing from the cavity to the outside or into an outer region of the machine rotor shaft. Alternatively or in addition, the machine rotor shaft has at least one opening for cooling the energy transfer system or the machine rotor. The machine rotor shaft preferably has a plurality of cooling openings. These cooling openings are preferably designed and arranged so that an air flow can form and/or spread within the machine rotor shaft and/or the at least one energy transfer system. In this way, heat build-up within the rotor can be reduced or avoided.

The at least one energy transfer system of the exciter device is configured for a contactless transfer of energy. Contactless transfer of energy is understood to mean e.g. wireless, brushless and, in particular, inductive or capacitive transfer of energy. In particular, the energy transfer system of the exciter device is an inductive or capacitive energy transfer system. In the case of inductive energy transfer, the energy transfer takes place in particular with the aid of a magnetic field.

The use of a contactless energy transfer system (in particular an inductive energy transfer system) offers a number of advantages though. In contrast to a slip ring system, a contactless energy transfer system is wear-free. Due to the integration into the rotor of the electrical machine, access to the energy transfer system in an existing system, e.g. to change the slip rings, is difficult and therefore unsuitable for series products. Furthermore, (graphite) dust generated by the slip ring can hardly be removed.

The use of a contactless transfer system offers more geometric freedom than the use of a slip ring system. For example, slip ring systems are typically very short axially, but require more radial installation space to accommodate the graphite rods. Owing to the principles involved, they are orthogonal to the rotating surface. In order to have the longest possible maintenance intervals, the graphite rods are usually relatively long. Alternatively, however, an axial slip ring system having a type of disk-shaped slip contacts on the rotor would be conceivable. In this way, the graphite rods can be attached axially and a radially short and axially elongated slip ring system can also be made possible. In the case of a typical configuration without integration into the rotor, the axial installation space required would be greatly increased in such a system.

By integrating the energy transfer system into the rotor, it is thermally encapsulated so that hardly any heat can be dissipated from the inside of the rotor. In addition, there is hardly any installation space for a cooling system. Therefore, the integration of classic slip ring contacts into the rotor is possible, but from a thermal point of view it is a challenge.

In addition, the efficiency of a contactless energy transfer system can be higher. In particular with the use of electrically highly conductive materials for flux shielding, efficiencies in the range of approximately 90% can be achieved over the entire operating range, whereby a contactless energy transfer system has no disadvantages in efficiency compared to slip ring systems. The losses in a contactless energy transfer system are independent of the speed of the machine. A contactless energy transfer system is advantageous particularly for large shaft diameters, since it avoids increased heat generation and increased abrasion, as would occur e.g. in the case of a slip ring system at high angular speeds.

In a further preferred embodiment, the at least one energy transfer system comprises a rotating energy transfer device or a rotating energy transmitter. In particular, the at least one energy transfer system of the exciter device comprises a stationary primary side (hereinafter also referred to as "exciter stator") and a rotatable or rotating secondary side (hereinafter also referred to as "exciter rotor"). The energy transfer system is preferably designed as an external rotor, i.e. the exciter stator is arranged inside the exciter rotor. In other words, the exciter stator and the exciter rotor are arranged such that the exciter rotor can rotate around the exciter stator. The exciter stator is preferably made of a magnetically as well as electrically non-conductive material. The exciter stator is particularly preferably made of a plastic (in particular a thermoplastic) such as POM or PEEK. The exciter stator (or a round bar of the exciter stator), which protrudes into the exciter rotor, can have a bore (in particular along the longitudinal axis of the exciter stator, i.e. a longitudinal bore or a channel) in order to cool the stator from the inside, in particular with air, water and/or oil as a coolant. Such cooling can prevent overheating of the energy transfer device inside the synchronous machine rotor or in the cavity of the machine rotor shaft and increase the efficiency.

In a further preferred embodiment, the at least one energy transfer system is arranged in the machine rotor such that the exciter rotor is connected to the machine rotor or the rotor shaft of the machine rotor in a rotatably fixed manner or a manner fixed against rotation. In particular, the exciter stator is an internal stator and the exciter rotor is an external rotor. In other words, the exciter stator is arranged inside the exciter rotor.

In a further preferred embodiment, the machine rotor has an exciter winding, wherein the exciter device is configured to transfer, in a contactless manner, electrical energy from a (stationary) primary side of the energy transfer system (or an "exciter stator") to a (rotatable or rotating) secondary side of the energy transfer system (or an "exciter rotor"), and finally from the secondary side of the energy transfer system (or from the exciter rotor) to the exciter winding of the machine rotor. The energy transfer from the exciter rotor to the exciter winding of the machine rotor takes place, in particular in wired form, via electronics connected in between (in particular via reactive power compensation or reactive power compensation unit and/or a rectifier).

In a further preferred embodiment, the exciter device further comprises at least one electronics device (in particular comprising a primary-side and/or secondary-side electronics device). The electronics device comprises in particular at least one compensation unit, an inverter and/or a rectifier.

The exciter device preferably comprises a primary-side electronics device with an inverter (in particular single-phase) and/or a secondary-side electronics device with a rectifier. The primary-side electronics device further preferably has a primary-side compensation unit, in particular a primary-side reactive power compensation unit. The secondary-side electronics device further preferably has a secondary-side compensation unit, in particular a secondary reactive power compensation unit. The secondary-side electronics device is preferably arranged on and/or outside the machine rotor shaft (or outside the cavity of the machine rotor shaft). For example, the secondary-side electronics device can be arranged in the region of a bearing of the machine rotor shaft and/or in the region of the exciter winding of the machine rotor.

In a further preferred embodiment, the arrangement further comprises an energy or voltage source (in particular a battery) and/or a converter. The converter can in particular be connected to the energy source and/or a stator winding of the electrically excited machine and serves to control the electrically excited machine. The converter for the electrically excited machine is in particular a multi-phase converter (e.g. a 3-phase converter).

In a further preferred embodiment, an operating frequency of the energy transfer system is independent of a speed of the electrically excited machine (electrically excited with the energy transfer system or the exciter device). In other words, an operating frequency of the energy transfer system is independent of an operating frequency of the electrically excited machine. In particular, operation of the energy transfer system or the exciter device (and thus excitation or torque generation of the electrically excited machine) during or from standstill of the electrically excited machine is possible.

The losses in a contactless energy transfer system are usually divided into copper losses in the conductor directly on the transfer path, losses in the shielding (especially eddy current losses), losses in other materials (such as hysteresis losses in the flux routing (caused by the magnetic field)), and losses in a downstream rectifier on the rotor. It is therefore advantageous to only integrate the transfer path itself into the machine rotor and to set up or arrange the rectifier outside of the machine rotor. For example, the rectifier can be arranged in the region of the bearing or the winding, through which air and/or oil mist (or finely atomized oil) flows. In this way, the heat sources in the encapsulated system within the machine rotor can be reduced to a minimum so that the temperature inside the rotor does not exceed a critical value even in the case of only poor ventilation.

In a further preferred embodiment, the exciter device comprises two or more energy transfer systems. In particular, the machine rotor can have two or more (divided or separated) rotor windings or rotor winding portions, wherein the exciter device preferably has an associated energy transfer system for each rotor winding or each rotor winding portion. This may be advantages to the operation or control. Furthermore, fail-safety can be guaranteed in this way. Also, the installation space available in the hollow shaft can thus be used as effectively as possible Alternatively or in addition, the exciter device further comprises at least one data transmission system, which is preferably integrated in the machine rotor. The data transmission system is preferably configured for contactless or wireless, in particular brushless, capacitive or inductive transmission of data (in particular with the aid of a magnetic field). The at least one data transmission system is preferably arranged in a cavity of the machine rotor shaft. The data transmission system is preferably configured to transmit data from the rotor (e.g. temperature and/or current of the rotor or rotor winding), which are detected e.g. by means of sensors and/or measuring devices. The data transmission system preferably comprises a data transmission stator and a data transmission rotor, the data transmission rotor preferably being connected to the machine rotor or the rotor shaft of the machine rotor in a non-rotatable or rotatably fixed manner. The data transmission preferably takes place in a non-contact manner from the data transmission rotor to the data transmission stator of the data transmission system.

In a further preferred embodiment, an additional electrically conductive material layer is arranged on at least one active part of the energy transfer system, an active part of the energy transfer system being a part of the energy transfer system which is at least partially exposed to a magnetic field used for energy transfer, and wherein the electrical conductivity of the additional material layer is greater than the electrical conductivity of the at least one active part.

By the arrangement of an additional electrically conductive material layer on at least one active part of the energy transfer system, in particular on the exciter stator, the efficiency of the energy transfer system can be increased. In particular, the efficiency of the energy transfer system can be increased and/or a reduction in the heat build-up in the energy transfer system can be achieved.

Arranging an additional electrically conductive material layer on at least one active part of the energy transfer system includes in particular applying an additional electrically conductive material layer to at least one active part of the energy transfer system. In particular, an additional electrically conductive material layer can be added to at least one active part of the energy transfer system.

The term "additional electrically conductive material layer" means that an electrically conductive material layer is used in addition to the already existing electrically conductive materials of the energy transfer system. An energy transfer system comprises a large number of electrically conductive components or materials that are used or are necessary for the intended function of the energy transfer system. For example, the stator, rotor or a shaft of the energy transfer system comprises electrically conductive materials that enable the fundamental function of the energy transfer system, namely to transfer energy. However, an "additional electrically conductive material layer" in the context of the present invention is not one of the materials provided or required for the basic operation of the energy transfer system. In addition to the already existing electrically conductive materials of the energy transfer system, the "additional electrically conductive material layer" rather represents an additional component that is not absolutely necessary for operation, but reduces heat build-up during operation of the energy transfer system and can increase the efficiency of the energy transfer system.

The term "active part" (also "active component" or "active region") of the energy transfer system is understood to mean a part, a component or a region of the energy transfer system which at least partially is exposed to the magnetic field used for energy transfer. In particular, this means a part, a component or a region of the energy transfer system which is exposed to a magnetic field strength or magnetic flux density caused by the magnetic field used for energy transfer which is at least 1%, preferably at least 0.1%, and particularly preferably at least 0.01% of the magnetic field strength or magnetic flux density generated by the magnetic field used for energy transfer. In other words, an active part of the energy transmission system in the context of the present description is in particular a part, a component or a region of the energy transfer system which is exposed to the magnetic field used for energy transfer at least 1%, preferably at least 0.1%, and particularly preferably at least 0.01%. An active part is in particular a part, a component or a region of the energy transfer system which is located at a point in the energy transfer system where more than 1%, preferably more than 0.1%, and particularly preferably more than 0.01% of the maximum value of the magnetic flux density present in the energy transfer system is present. The above values relate to the magnetic flux density that is generated or can be measured by the coils of the energy transfer system in an air space without metallic components.

The additional electrically conductive material layer can e.g. be completely or partially made of copper with an electrical conductivity of $58 \cdot 10^6$ S/m, and/or silver with an electrical conductivity of $61 \cdot 10^6$ S/m and/or gold with an electrical conductivity of $45 \cdot 10^6$ S/m.

In a further preferred embodiment, the additional electrically conductive material layer is arranged on a coil system of the energy transfer system. In particular, the arrangement takes place in the region of electrically poorly conductive (or electrically non-conductive) and at the same time magnetically conductive materials, or in the region of electrically poorly conductive (or electrically non-conductive) and at the same time magnetically non-conductive materials. Here, "poorly electrically conductive" is in particular understood to mean that the electrical conductivity is lower, in particular significantly lower, than the electrical conductivity of the additionally arranged electrically conductive layer.

In a further preferred embodiment, the energy transfer system has a stator made of an electrically non-conductive material and/or a magnetically non-conductive material.

In the context of the present invention, it was found that the materials used in a rotating energy transfer system (e.g. for the stator, rotor and/or the shaft), which are exposed to the magnetic field generated for the energy transfer, can heat up strongly due to eddy currents induced in these materials due to the magnetic field. This also results in losses that reduce the efficiency of the energy transfer system. The degree of heating in a material depends in particular on the electrical conductivity of the material. For materials with a relatively low electrical conductivity, such as steel, heating is usually higher than for materials with a higher electrical conductivity, such as copper or silver.

In order to reduce heating or heat generation, according to the invention, an additional highly conductive material layer can be arranged or applied to a less conductive material of the energy transfer system exposed to the magnetic field generated for energy transfer. Due to the so-called skin effect, it can advantageously be achieved that the magnetic field or alternating magnetic field used for the energy transfer penetrates less far into the material composite. This is because the so-called penetration depth δ of the magnetic field and thus also the eddy currents induced by the magnetic field into the material is smaller the smaller the specific electrical resistance is, i.e. the greater the electrical conductivity of the material is. This will be explained in more detail below. In particular, it can thus be achieved that eddy currents form mainly or exclusively in the additionally arranged, electrically highly conductive material layer, which advantageously further contributes to the fact that heating of the material composite is reduced by the eddy currents. "Material composite" is understood to mean a composite or a combination of the material to which the additional electrically conductive material layer is applied and the additional electrically conductive material layer.

Eddy currents form at high frequencies only on the surface of the material. The penetration depth δ (skin effect) determines how far an alternating magnetic field penetrates into an electrically conductive material and thus causes eddy currents. The penetration depth δ for round conductors is calculated as follows:

$$\delta = \sqrt{\frac{2\rho}{\omega\mu}},$$

where ρ is the specific electrical resistance of the conductor, ω is the angular frequency of the magnetic field, and μ is the absolute permeability of the conductor. The penetration depth therefore depends on the material and the frequency. In the case of technically sensible structures (great mechanical stability) and high frequencies, the material used in an energy transfer device is generally thicker than the penetration depth δ and electrically conductive (e.g. steel shaft). Furthermore, due to the endeavor to keep the structural size small, it is usually not possible to choose the distance between the magnetic field and the electrically conductive material to be so large that the field strength and thus the strength of the eddy current are negligible. As a result, eddy currents cannot be avoided in systems of small construction size. In the context of the present invention, however, it can be achieved that, on the one hand, the eddy currents penetrate into the material as little as possible and, on the other hand, form mainly or exclusively in the additionally arranged material layer, which reduces heating and thus also any energy or power losses. Consequently, the efficiency of the energy transfer system can also be increased.

The following table shows an example of the relationship between the drop in the electric loading and the penetration depth (drop to 1/e, i.e. to approximately 37%) at different frequencies for a round copper conductor:

| Frequency | Penetration depth | Frequency | Penetration depth |
| --- | --- | --- | --- |
| 5 Hz | 29.7 mm | 5 MHz | 29.7 μm |
| 16 Hz | 16.6 mm | 16 MHz | 16.6 μm |
| 50 Hz | 9.38 mm | 50 MHz | 9.38 μm |
| 160 Hz | 5.24 mm | 160 MHz | 5.24 μm |
| 500 Hz | 2.97 mm | 500 MHz | 2.97 μm |
| 1.6 kHz | 1.66 mm | 1.6 GHz | 1.66 μm |
| 5 kHz | 938 μm | 5 GHz | 938 nm |
| 16 kHz | 524 μm | 16 GHz | 524 nm |
| 50 kHz | 297 μm | 50 GHz | 297 nm |
| 160 kHz | 166 μm | 160 GHz | 166 nm |
| 500 kHz | 93.8 μm | 500 GHz | 93.8 nm |
| 1.6 MHz | 52.4 μm | 1.6 GHz | 52.4 nm |

Typical operating frequencies for contactless inductive energy transfer are in the range of 50-500 kHz, which corresponds to a penetration depth for copper of 297-93 μm. The development in power electronics meanwhile allows higher frequencies, so that in the following a frequency of 500 kHz is considered. Furthermore, the coil system can also be optimized to a higher frequency, and thus the construction size of the coil and the capacitor can also be reduced. In the case of a smaller penetration depth δ associated with a higher frequency, the present invention has an even more advantageous effect.

In a preferred embodiment, the at least one active part of the energy transfer device is a component of a stationary primary side or a stator of the energy transfer device. Alternatively or in addition, the at least one active part of the energy transfer device is a component of a rotatable and/or rotating secondary side or a rotor of the energy transfer device. In other words, the at least one active part of the energy transfer device comprises a stator and/or a rotor of the energy transfer device. In particular, the at least one active part of the energy transfer device is a stator and/or a rotor of the energy transfer device. In the context of this invention, the term stator of the energy transfer device is in particular understood to mean a stationary primary side of the energy transfer device. In the context of this invention, the term rotor of the energy transfer device is in particular understood to mean a rotatable or rotating secondary side of the energy transfer device. In particular, the secondary side (or the rotor) of the energy transfer device is rotatable around the stationary primary side (or the stator).

In a further preferred embodiment, the at least one active part of the energy transfer device comprises a shaft or drive shaft or rotor shaft or rotor drive shaft and/or a heat sink and/or a ferrite platelet and/or a housing and/or a ferrite disk and/or a cover and/or a stator winding and/or a rotor winding of the energy transfer system. In particular, the at least one active part of the energy transfer device is a shaft or drive shaft or rotor shaft or rotor drive shaft and/or a heat sink and/or a ferrite platelet and/or a housing and/or a ferrite disk and/or a cover and/or a stator winding and/or a rotor winding of the energy transfer device. The shaft or rotor shaft can be a steel shaft, for example.

Instead of using a ferrite (or the ferrite platelet and/or the ferrite mat), it can be advantageous to use an electrically and magnetically non-conductive material, in particular plastic. In particular by arranging such a non-conductive material (such as plastic) between the additional electrically conductive material layer and a coil of the energy transfer system can a distance between the additional electrically conductive material layer and the coil be established or maintained. In other words, a non-conductive material, e.g. in the form of a spacer element, can be arranged between the additionally electrically conductive material layer and a coil of the energy transfer device. The non-conductive material, in particular the spacer element made of non-conductive material, can e.g. comprise plastic or consist entirely of plastic. The non-conductive material, in particular the spacer element made of non-conductive material, can e.g. be ferrite-free, i.e. do not contain ferrite and preferably no composite material comprising ferrite. Thus, the non-conductive material, in particular the spacer element, can differ from a ferrite mat, since the non-conductive material is free of ferrite composites, i.e. does not have any ferrite composites. In the context of the present invention, it was found that such a distance advantageously leads to the fact that losses that would occur upon direct arrangement or application of the coil to the additional electrically conductive material layer can be reduced or avoided. In addition, by using plastic instead of ferrite, the material costs can be reduced. Especially if the additional electrically conductive material layer is a copper layer can it be advantageous to use a non-conductive plastic instead of the ferrite, in particular in such a way that a distance between the copper layer and the coil, as would also be the case when ferrite was used, is maintained.

In a further preferred embodiment, the layer thickness of the arranged additional material layer is selected as a function of a predetermined frequency of the magnetic field used for energy transfer or the associated magnetic flux density. The predetermined frequency corresponds in particular to the operating frequency at which the energy transfer device is operated or is intended to be operated. In this way, the penetration depth of the magnetic field and thus the penetration depth of eddy currents induced by the magnetic field can be adjusted in such a way that the eddy currents form mainly or exclusively in the arranged additional material layer, i.e. penetrate into the active parts of the energy transfer system only to a small extent or not at all. Preferably, the layer thickness of the additional electrically conductive material layer is selected such that in the region of the arranged additional material layer at least 60%, in particular 63%, of the eddy currents induced by the magnetic field used for energy transfer are formed or occur in the additional material layer. More preferably, the layer thickness of the additional electrically conductive material layer is selected in such a way that in the region of the arranged additional material layer at least 70%, even more preferably at least 80%, even more preferably at least 90%, most preferably at least 95% and in particular at least 99% of the eddy currents induced by the magnetic field used for energy transfer are formed or occur in the additional material layer. Conversely, this means that the proportion of eddy currents generated by the magnetic field in the active part of the energy transfer system, i.e. in the materials on which the additional electrically conductive material was arranged or applied, is maximally 40%, preferably maximally 20%, even more preferably maximally 10%, and most preferably maximally 5%.

In a further preferred embodiment, the layer thickness of the arranged additional material layer corresponds to at least one penetration depth into the material of the additional material layer, caused by or as a result of the skin effect, at a predetermined frequency of the magnetic field used for energy transfer. The predetermined frequency corresponds in particular to the operating frequency at which the energy transfer system is operated or is intended to be operated. The layer thickness of the arranged additional material layer is preferably at least twice, more preferably three to five times, i.e. for example at least three times, at least four times or at least five times the penetration depth into the material of the additional material layer, caused by or as a result of the skin effect, at a predetermined frequency of the magnetic field used for energy transfer. With a material thickness that corresponds to the penetration depth caused by the skin effect, $1-1/e^1=63\%$ of the eddy currents generated are contained in the additional highly conductive material. With a layer thickness that corresponds to five times the penetration depth caused by the skin effect, $1-1/e^5=99.33\%$, i.e. approximately 99% of the eddy currents generated, are contained in the additional highly conductive material. In this way, any losses are advantageously generated mainly or only in the additional highly conductive material.

In a further preferred embodiment, the additional electrically conductive material layer has a relative permeability $\mu_r$ of approximately 1. In other words, the additional electrically conductive material layer does not have any increasing magnetic conductivity. In the context of the present invention, it was recognized that any eddy current losses can be kept low or minimized in this way. This knowledge arises from the following consideration: Assuming that the material thickness $d_M$ is much greater than the penetration depth δ (i.e. $d_M \gg \delta$), the eddy current $I_W$ caused in the material is essentially constant and corresponds e.g. to the product N·I of winding number N and current I of a coil causing the eddy current. If the material thickness $d_M$ is much smaller than the penetration depth $\delta$ ($d_M \gg \delta$), the magnetic flux penetrates the material completely and the induced voltage $U_i$ only depends on the frequency $\omega$, with $U_i \sim \omega$. For $d_M \gg \delta$, the eddy current losses $P_V$ can be specified as follows:

$$P_V = I_W^2 \cdot R_{M,eff}, \text{ with } R_{M,eff} \sim \frac{\rho}{\delta}$$

$$P_V \sim \sqrt{\mu \cdot \omega \cdot \rho}.$$

And for $d_M \ll \delta$, the eddy current losses $P_V$ can be specified as follows:

$$P_V = \frac{U_i^2}{R_{M,eff}}, \text{ with } R_{M,eff} \sim \frac{\rho}{d_M}$$

$$P_V \sim \frac{\omega^2}{\rho}.$$

Consequently, especially for the case $d_M \gg \delta$ present in practice, the eddy current losses can be kept low if the additional electrically conductive material layer does not have an increasing magnetic conductivity, i.e. if the absolute magnetic permeability $\mu = \mu_r \cdot \mu_0$ essentially corresponds to the magnetic field constant $\mu_0$ and thus the relative permeability $\mu_r$ of the additional conductive material layer is approximately 1.

Alternatively or in addition, the additional electrically conductive material layer is arranged or applied to a non-conductive material of the at least one active part, which is arranged in a region of the energy transfer system that is to be shielded from the magnetic field used for energy transfer in an outer region of the energy transfer device.

In a further preferred embodiment, the at least one active part comprises a magnetic flux carrier element with a ferrite-polymer composite material, with the additional electrically conductive material layer being arranged directly on the magnetic flux carrier element.

In a further preferred embodiment, the additional electrically conductive material layer is insulated from the at least one active part. Alternatively or in addition, the additional electrically conductive material layer is electrically insulated from the electrical machine. In particular, the additional electrically conductive material layer in the energy transfer device does not have to be electrically conductively connected to an active part. In other words, the additional electrically conductive material layer can be electrically insulated from the at least one active part and/or from the electrical machine or from components (in particular all components) of the electrical machine.

In a further preferred embodiment, the additional electrically conductive material layer has a layer thickness so that the additional electrically conductive material layer, in particular exclusively, shields a high-frequency intrinsic magnetic field of the energy transfer device. Alternatively or in addition, the additional electrically conductive material layer has a layer thickness so that the additional electrically conductive material layer has no effect with respect to an extrinsic magnetic field of the electrical machine. In other words, the layer thickness of the additional electrically conductive material layer within the energy transfer device is so pronounced that the additional electrically conductive material layer only shields the high-frequency intrinsic magnetic field of the energy transfer device and/or does not show any effect for the extrinsic magnetic field of the electrical machine, in particular due to a changed penetration depth. This can in particular be the case because the at least one externally arranged active part has a shielding effect against the extrinsic field of the electrical machine, and/or the extrinsic electrical field is low-frequency such that it permeates the materials in the energy transfer device, including the additional electrical conductive material layer, completely due to the penetration depth.

In a further preferred embodiment, the at least one active part comprises a magnetic flux carrier element with a ferrite-polymer composite material, with the additional electrically conductive material layer being arranged directly on the magnetic flux carrier element.

In a further preferred embodiment, the energy transfer system has a stator and a rotor, the at least one active part of the energy transfer device being a component of the stator and/or rotor of the energy transfer system.

In a further preferred embodiment, the at least one active part of the energy transfer system comprises or is a rotor shaft or rotor drive shaft, in particular a steel shaft, and/or a stator winding.

In a further preferred embodiment, the layer thickness of the arranged additional material layer is selected as a function of a predetermined frequency of the magnetic field used for energy transfer.

In a further preferred embodiment, the layer thickness of the additional material layer is selected such that eddy currents are formed by the magnetic field substantially only or exclusively in the additional material layer and not in the active component.

A further independent aspect for solving the object relates to an electrically excited machine, comprising:
a machine stator; and
an arrangement according to the invention, i.e. in particular a machine rotor and an exciter device for electrically exciting the machine, the exciter device comprising at least one energy transfer system integrated in the machine rotor.

The electrically excited machine may be a synchronous machine or a transverse flux machine, for example.

In particular, a further independent aspect for solving the object relates to an electrically excited synchronous machine, comprising:
a synchronous machine stator; and
an arrangement according to the invention, i.e. in particular a synchronous machine rotor and an exciter device for electrically exciting the machine, the exciter device comprising at least one energy transfer system integrated in the rotor of the synchronous machine.

Moreover, a further independent aspect for solving the object in particular relates to a transverse flow machine, comprising:
a transverse flux stator; and
an arrangement according to the invention, i.e. in particular a transverse flux rotor and an exciter device for electrically exciting the transverse flux machine, the exciter device comprising at least one energy transfer system integrated in the rotor of the transverse flux machine.

The statements made above or below on the embodiments of the first aspect also apply to the above-mentioned further independent aspects and in particular to the respective preferred embodiments. In particular, the statements made above and below on the embodiments of the respective other independent aspects also apply to an independent aspect of the present invention and to respective preferred embodiments.

In the following, individual embodiments for solving the object will be described exemplarily with the aid of the figures. Some of the individual embodiments described have features that are not absolutely necessary in order to carry out the claimed subject matter, but that provide the desired properties in certain applications. Embodiments not including all the features of the embodiments described below should also be seen as being disclosed by the technical teaching described. Furthermore, in order to avoid unnecessary repetition, certain features are only mentioned in relation to some of the embodiments described below. It should be noted that the individual embodiments should therefore not only be viewed individually, but be viewed together. On the basis of this overview, the person skilled in the art will recognize that individual embodiments can also be modified by including individual or multiple features of other embodiments. It is pointed out that a systematic combination of the individual embodiments with one or more features described in relation to other embodiments can be desirable and useful and therefore be considered and also be regarded as included in the description.

DETAILED DESCRIPTION OF THE DRAWINGS

Figure 1A:
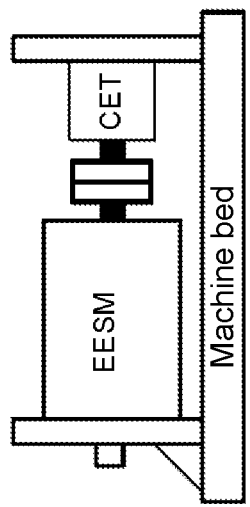
FIGS. 1A-1C each show a schematic drawing of a conventional electrically excited synchronous machine.
Figure 1B:
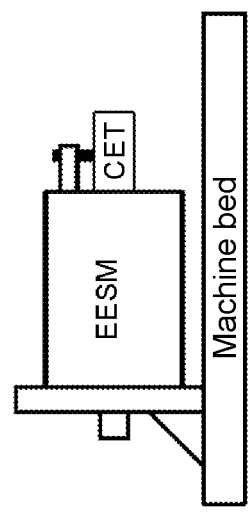
Figure 1C:
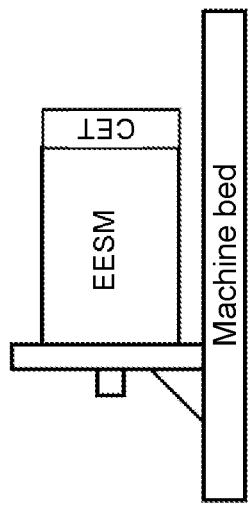

FIGS. 1A-1C each show a schematic drawing of a conventional electrically excited synchronous machine (EESM). The electrically excited synchronous machine is arranged on a machine bed. To get energy to the rotor of the electrically excited synchronous machine, a slip ring system has been used in most cases so far. Alternatively, contactless energy transfer systems (CET) are also in the development and prototype phase. Regardless of the energy transfer system used, it is conventionally attached laterally in the axial direction to the active part of the synchronous machine. The energy transfer system required for an EESM thus increases the installation space in the axial direction. FIGS. 1A-1C show examples of the typical attachment of a contactless energy transfer system (CET) to an EESM. Instead of the respective contactless energy transfer system shown in these figures, a slip ring system can also be used. The abbreviation CET is meant to representatively stand for a slip ring system as well. The examples shown in FIGS. 1A-1C differ in the type of mounting. In the embodiment of FIG. 1A, the bearing of the synchronous machine is also used for the transfer system, the transfer system itself not being supported separately. The transfer system of FIG. 1B is supported itself and is therefore independent of the synchronous machine. In order to prevent the stator of the transfer system from rotating caused by bearing friction, it is attached to the synchronous machine by means of a pin. FIG. 10 shows a transfer system that is supported itself and also constructed separately from the synchronous machine with a coupling. Therefore, the transfer system must be secured completely independently.

Figure 2:
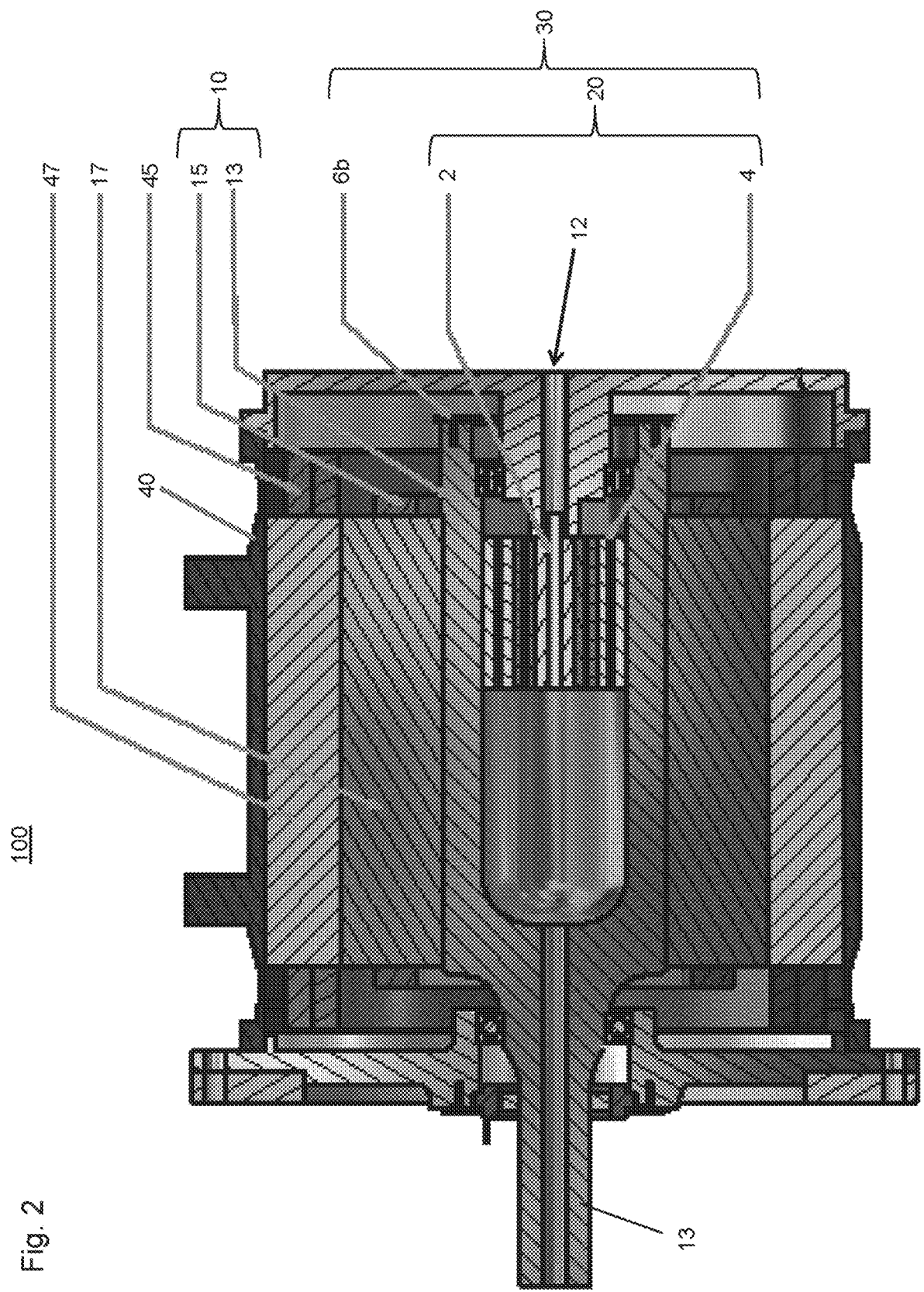
FIG. 2 shows a schematic sectional drawing of an electrically excited synchronous machine according to a preferred embodiment of the present invention.

FIG. 2 shows a schematic cross-sectional drawing (CAD drawing) of an electrically excited synchronous machine 100 according to a preferred embodiment of the present invention. The synchronous machine 100 comprises a synchronous machine rotor 10, a synchronous machine stator 40, and an exciter device 30. The synchronous machine 100 is designed as an internal rotor, i.e. the synchronous machine rotor 10 is spatially surrounded by the synchronous machine stator 40. In other words, the synchronous machine rotor 10 is arranged inside the synchronous machine 100, whereas the synchronous machine stator 40 is arranged outside the synchronous machine 100. In particular, the synchronous machine rotor 10 is arranged in a cavity of the synchronous machine stator 40. The synchronous machine rotor 10 has a synchronous machine rotor winding 15 that, due to its function within the electrically excited synchronous machine 100, is also referred to as an exciter winding 15. The synchronous machine stator 40 accordingly has a synchronous machine stator winding 45.

The exciter device 30 serves for the electrical excitation of the synchronous machine 100 or the synchronous machine rotor 10 of the synchronous machine 100. The exciter device 30 comprises an energy transfer system 20 integrated in the synchronous machine rotor 10. The synchronous machine rotor 10 has a synchronous machine rotor shaft 13 and an exciter winding 15. The energy transfer system 20 of the exciter device 30 is arranged in a cavity of the synchronous machine rotor shaft 10.

According to the embodiment shown in FIG. 2, the energy transfer system 20 is a contactless or inductive energy transfer system. The energy transfer system 20 comprises or is a rotating energy transfer device. The energy transfer system 20 or the energy transfer device comprises an exciter stator 2 and an exciter rotor 4. The exciter rotor 4 spatially surrounds the exciter stator 2. In other words, the exciter stator is arranged inside the energy transfer system 20, whereas the exciter rotor is arranged outside the energy transfer system 20. In particular, the exciter stator 2 is arranged in a cavity of the exciter rotor 4. The energy transfer system 20 is thus designed as an external rotor.

The energy transfer system 20 is arranged in the synchronous machine rotor 10 in particular in such a way that the exciter rotor 4 is connected to the synchronous machine rotor 10 in a rotatably fixed manner. The exciter rotor 4 thus rotates together with the synchronous machine rotor 10. In other words, the exciter rotor 4 and the synchronous machine rotor 10 are arranged and/or coupled or connected to one another in such a way that the rotational movements of the exciter rotor 4 and the synchronous machine rotor 10 are synchronized. The exciter rotor 4 and the synchronous machine rotor 10 consequently have the same angular speed and/or rotational speed in the operating state.

The exciter device 30 is configured to transfer electrical energy in a contactless manner from the exciter stator 2 to the exciter rotor 4 of the exciter device 30 and finally from the exciter rotor 4 to the exciter winding 15 of the synchronous machine rotor 10. The exciter device 30 further comprises an electronics device 6, which comprises a primary-side electronics device 6a and a secondary-side electronics device 6b (see also FIGS. 7 to 9). In FIG. 2, only the secondary-side electronics device 6b can be seen, which is arranged on and/or outside the synchronous machine rotor shaft 13. In particular, the secondary-side electronics device 6b comprises one or more capacitors for compensating for the reactive power. As an alternative or in addition, the secondary-side electronics device 6b can comprise a rectifier. With the help of the rectifier, an alternating voltage generated by the energy transfer system 20 can be rectified in order to supply the exciter winding 15 of the synchronous machine rotor 10 with direct voltage or to feed direct current into the exciter winding 15 of the synchronous machine rotor 10, and thus generate a magnetic field.

The synchronous machine rotor 10 further has a magnetic flux carrier element 17. Accordingly, the synchronous machine stator 40 further has a magnetic flux carrier element 47. The magnetic flux carrier element 17 of the synchronous machine rotor 10 is arranged between the magnetic flux carrier element 47 of the synchronous machine stator 40 and the synchronous machine rotor shaft 13. The magnetic flux carrier element 17 serves to carry the magnetic flux on the synchronous machine rotor 10, and the magnetic flux carrier element 47 serves to carry the magnetic flux on the synchronous machine stator 40.

In order to reduce any losses, e.g. due to eddy currents and/or heating, the exciter stator 2 is preferably formed from a magnetically non-conductive as well as electrically non-conductive material (in particular from a plastic such as POM or PEEK). This is advantageously possible since no particular stability requirements are made of the exciter stator 2 of the energy transfer system 20. It must only be possible to apply windings to the exciter stator 2. Of course, it is also possible to manufacture the exciter stator 2 from steel or aluminum. In this case, it is advantageous to apply an additional, highly conductive electrical layer to the exciter stator 2.

The exciter stator 2 has a bore forming a cooling channel along its longitudinal axis. In other words, the exciter stator 2 is formed to be hollow or tubular. A coolant such as air, water and/or oil can be fed into the cooling channel via an inlet 12. The coolant can move through the cooling channel of the exciter stator 2 and thus effectively cool the exciter stator 2 from the inside. Advantageously, the synchronous machine rotor 10 is also cooled from the inside as a result. The inlet 12 can at the same time also serve as an outlet for the coolant.

Figure 3:
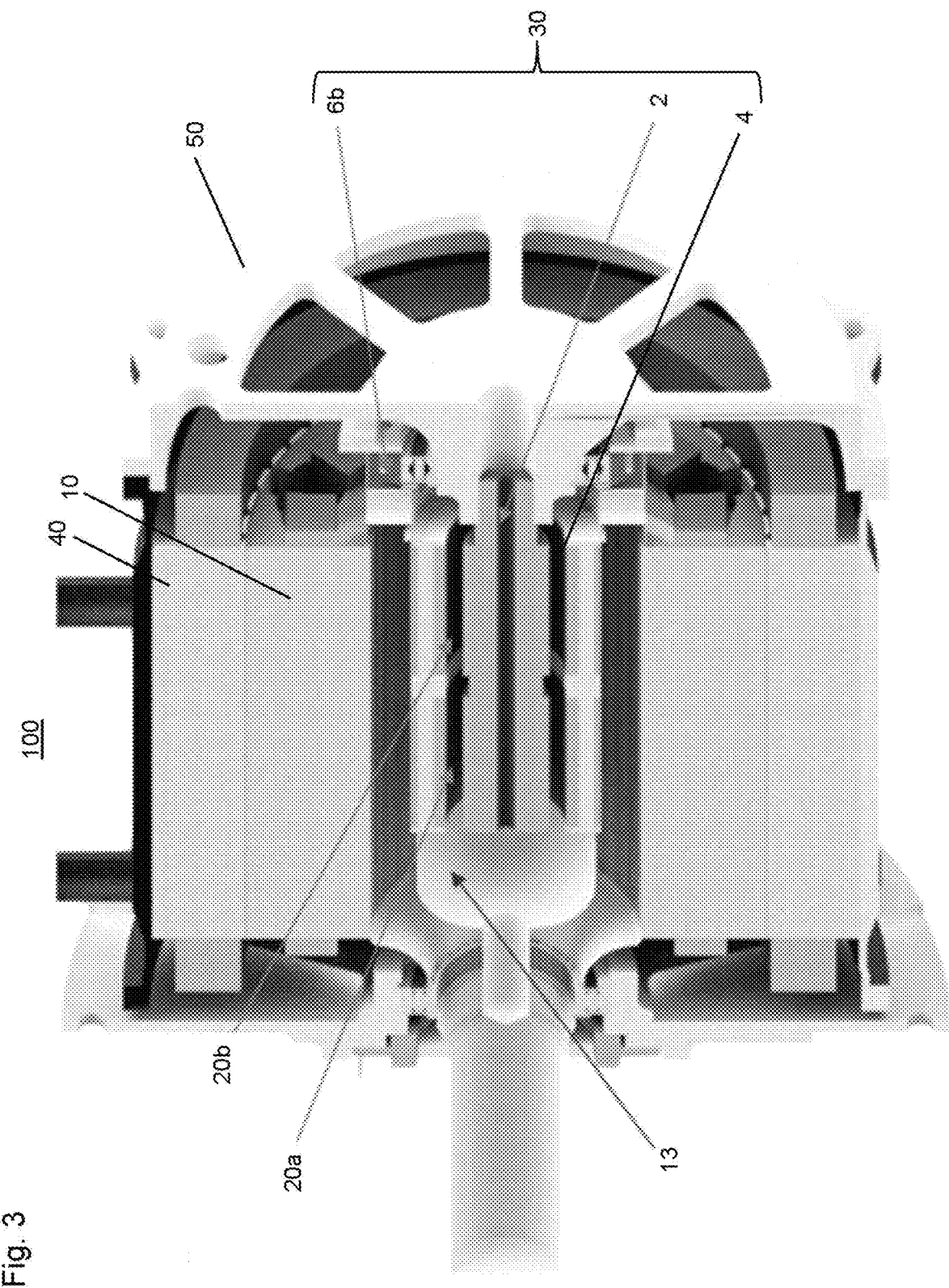
FIG. 3 shows a schematic sectional drawing of an electrically excited synchronous machine according to a further preferred embodiment of the present invention.

FIG. 3 shows a schematic drawing of an electrically excited synchronous machine 100 according to a further preferred embodiment of the present invention. As in FIG. 2, the synchronous machine 100 of FIG. 3 also has a synchronous machine rotor 10, a synchronous machine stator 40 and an exciter device 30. Furthermore, a cover 50 of the synchronous machine 100 can also be seen. In contrast to FIG. 2, however, the exciter device 30 of FIG. 3 comprises two energy transfer systems 20a and 20b, which are each integrated in the synchronous machine rotor 10. Both energy transfer systems 20a and 20b are arranged in a cavity of the synchronous machine rotor shaft 13. Alternatively, for example, the second energy transfer system 20b could also be a data transmission system. It goes without saying that generally a large number of energy transfer systems and/or a large number of data transmission systems can also be integrated in the synchronous machine rotor 10 or in the cavity of the synchronous machine rotor shaft 13.

A challenge in the construction of the synchronous machine with an integrated energy transfer system is in particular the mechanical mounting of the non-output side (right side in FIG. 3) of the synchronous machine 100. In particular, a bearing identical in construction as on the output side (left side in FIG. 3) can be used, however, in the case of the non-output side bearing, an outer part of the bearing rotates while an inner part of the bearing is stationary. A stationary element on which the bearing is attached (such as the cover 50, for example) preferably has one or more openings in order, on the one hand, to accomplish a connection to the stationary part or to the exciter stator 2 of the energy transfer system 20 and, on the other hand, to allow air to circulate so that the heat does not accumulate in the interior of the rotor 10 or the rotor shaft 13 of the machine 100. Furthermore, the rotor shaft 13 also preferably has one or more openings for the passage of lines. Alternatively or in addition, the rotor shaft 13 can have one or more cooling openings for the passage of air and/or oil mist.

Figure 7:
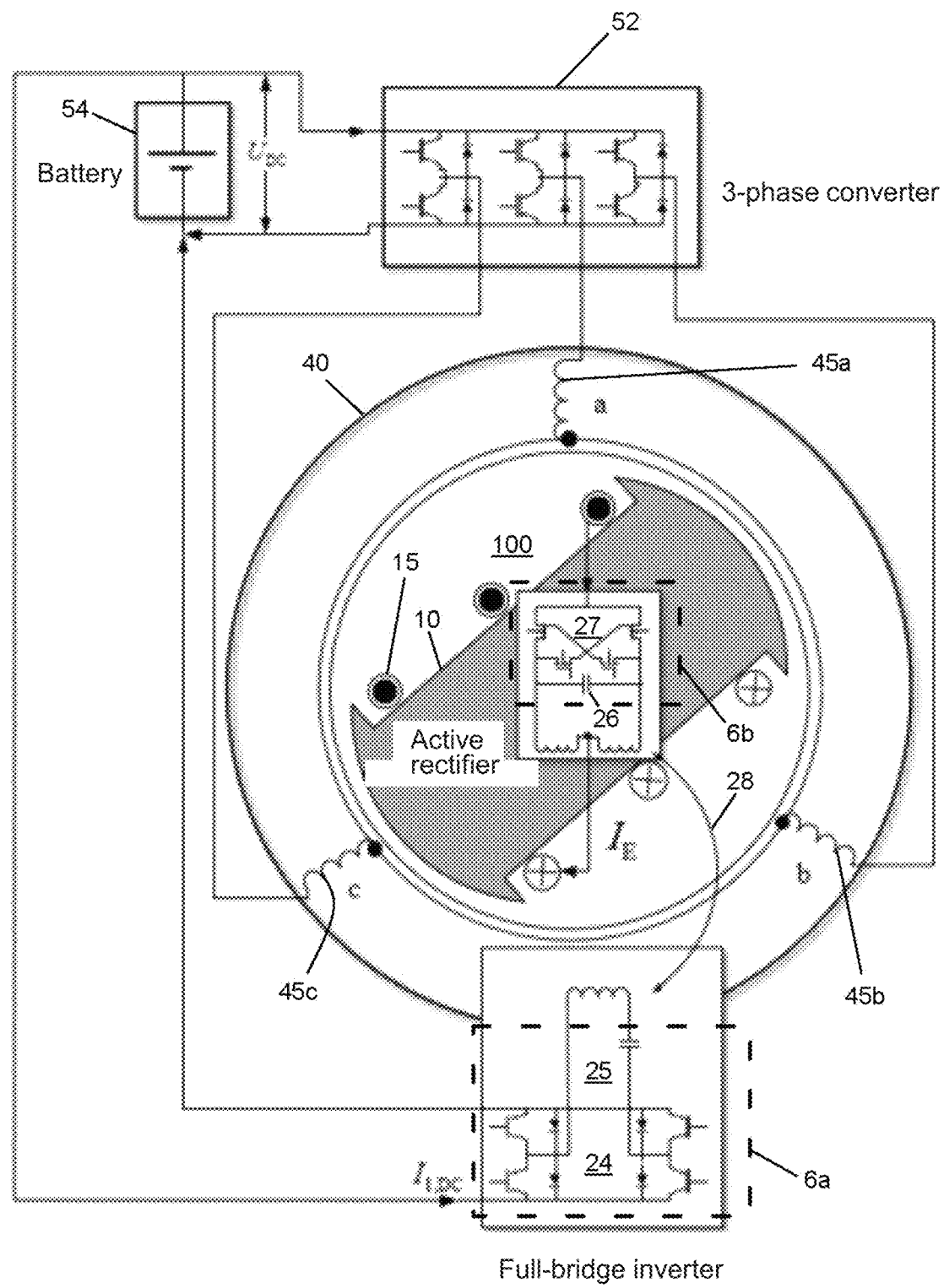
FIG. 7 shows a schematic drawing of an electrically excited machine with a circuit according to a preferred embodiment of the present invention.
Figure 8:
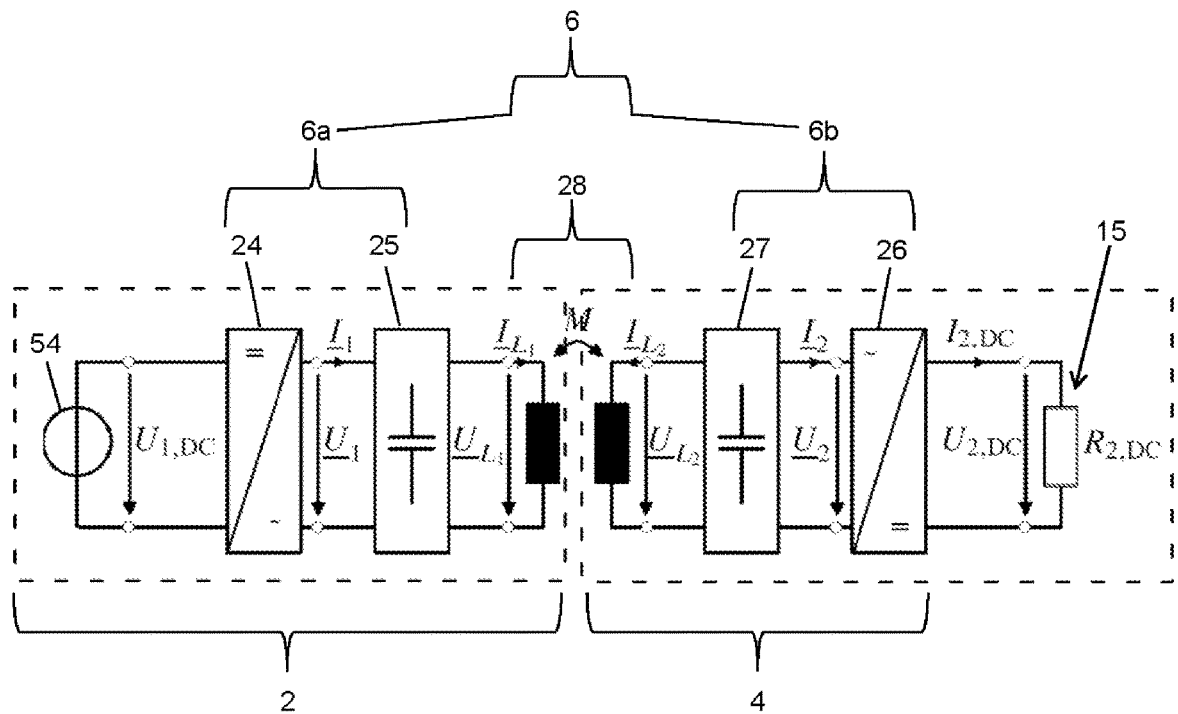
FIG. 8 shows an equivalent circuit diagram of an exciter device or an energy transfer system according to a preferred embodiment of the present invention.

The energy transfer system 20 comprises a primary side (stationary part or stator 2) and a secondary side (rotating part or rotor 4). The usual construction, i.e. with an outer stator and an inner rotor, is reversed in this case: The primary side of the energy transfer system 20 is arranged as an extension of the axis of rotation of the output shaft 13 of the synchronous machine 100 and located inside the secondary side of the energy transfer system 20. The cable routing to the primary side can pass through one or more openings in a (bearing) cover 50 on the non-output side (on the right in FIG. 3). The primary-side electronics 6a for controlling the primary side is shown in FIGS. 7 to 9. It can be integrated outside the machine 100, in the power electronics of the machine 100 or in the casing of the machine 100.

In the case of the rotating secondary side, the windings are on the inside, followed by a magnetic flux carrier (e.g. a deformable mat made of pressed ferritic composite) and an electrically highly conductive material (e.g. copper) for shielding radially outward. The secondary-side electronics 6b in particular comprises capacitors for reactive power compensation and a rectifier. The rectifier can be a passive full-bridge rectifier, an active half-bridge rectifier or a mixed form (comprising an active transistor and a passive diode per branch). Since the electronics components are the most sensitive components in thermal terms, a circuit board containing the electronic components is preferably attached to the edge of the machine rotor 10. It is thus remote from the two thermal hotspots, namely the energy transfer system 20 in the rotor 10 and the rotor windings 15 of the synchronous machine 100. The secondary-side electronics device or circuit board 6b can be cooled by natural or forced convection. In addition, the secondary-side electronics device 6b can be thermally decoupled from the synchronous machine rotor shaft 13 by thermally weakly conductive materials (e.g. plastic such as POM or PEEK), since in electrical machines it typically has temperatures inadmissible for the components. The connection from the secondary side to the secondary-side electronics is preferably made by means of passages or openings in the synchronous machine rotor shaft 13. Additional cooling openings offer the possibility of an air flow within the energy transfer system 20, so that the heat within the synchronous machine rotor 10 or the synchronous machine rotor shaft 13 does not accumulate. In a preferred embodiment, an additional heat sink, in particular in the form of a ring, is attached for the secondary-side electronics device 6b. This heat sink is preferably insulated from the rotor shaft 13 by poorly conducting or thermally insulating materials.

Figure 4A:
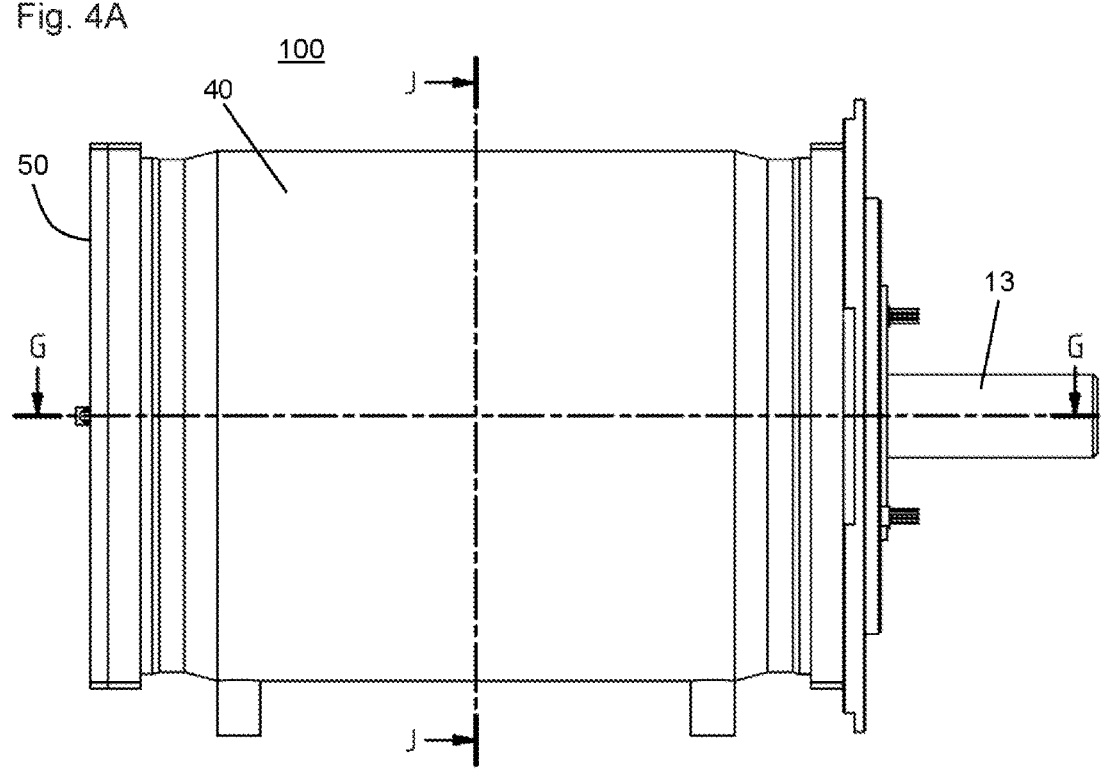
FIG. 4A shows a schematic drawing of an electrically excited synchronous machine according to a preferred embodiment of the present invention in a side view.

FIG. 4A shows a side view of an electrically excited synchronous machine 100 with a synchronous machine rotor shaft 13, a synchronous machine stator 40, and a cover 50 according to a preferred embodiment of the present invention. The cover 50 preferably has openings (not visible in FIG. 4A) that serve to dissipate heat or to cool the synchronous machine 100. The dashed lines G-G and J-J denote cutting planes which will be illustrated in the following FIGS. 4B to 5B.

Figure 4B:
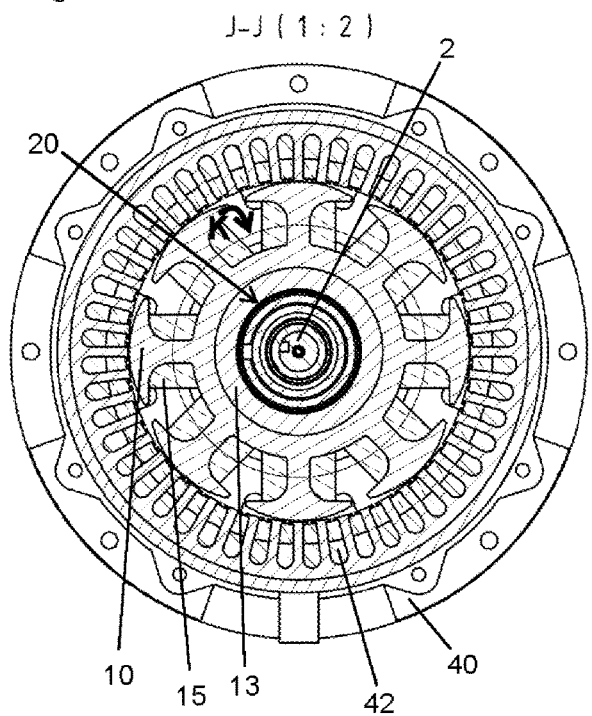
FIG. 4B shows a section J-J of the synchronous machine of FIG. 4A.

FIG. 4B shows a schematic sectional drawing J-J of the electrically excited synchronous machine 100 of FIG. 4A. In this sectional drawing, grooves 42 in synchronous machine stator 40 and individual poles of synchronous machine rotor 10 can be seen. Furthermore, the rotor shaft 13 and the rotor winding 15 of the synchronous machine (exciter winding) can be seen. In the interior of the rotor shaft 13 there is located at least one energy transmitter 20, with an exciter stator 2 of the energy transmitter 20 being arranged in the center of the energy transmitter 20.

Figure 4C:
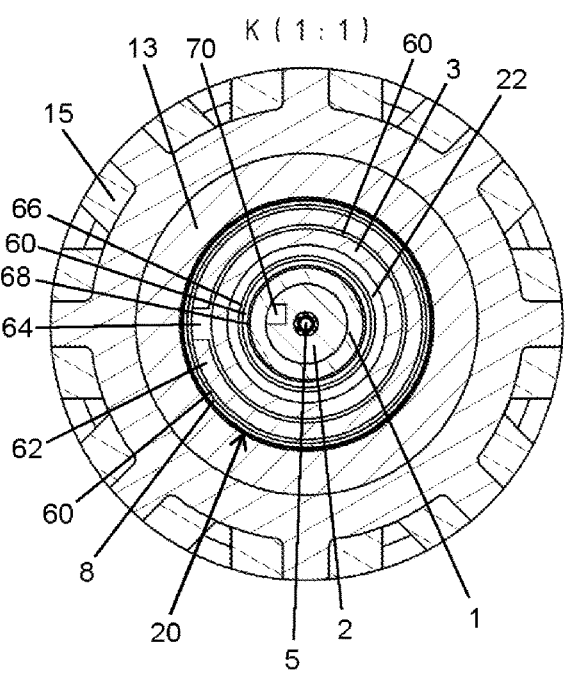
FIG. 4C shows an enlarged section K of FIG. 4B.

FIG. 4C shows a magnification of section K of FIG. 4B. The at least one energy transfer system 20 arranged inside the synchronous machine rotor shaft 13 has the following components from the outside to the inside: an additional electrically highly conductive layer 8 (in particular a copper layer), an adhesive 60, a plastic holder 62 with an integrated flux-carrying material (in particular a flux-conducting composite), and a recess 64 for the return of the exciter rotor winding 3, an adhesive 60, the exciter rotor winding 3, an air gap 22, a plastic sleeve 66, an adhesive 60, a bandage 68, the exciter stator winding 1, and the exciter stator 2 with a return element 70 for returning the exciter stator winding 1. Furthermore, in the center or in the stator 2 of the at least one energy transmitter 20, a cooling channel 5 (in particular a water channel) for the active cooling of the stator 2 of the energy transfer system 20 can be seen. If the winding was made in two layers (back and forth), the return element 70 can be dispensed with. In this case, the cooling channel 5 can be made correspondingly larger.

Figure 5A:
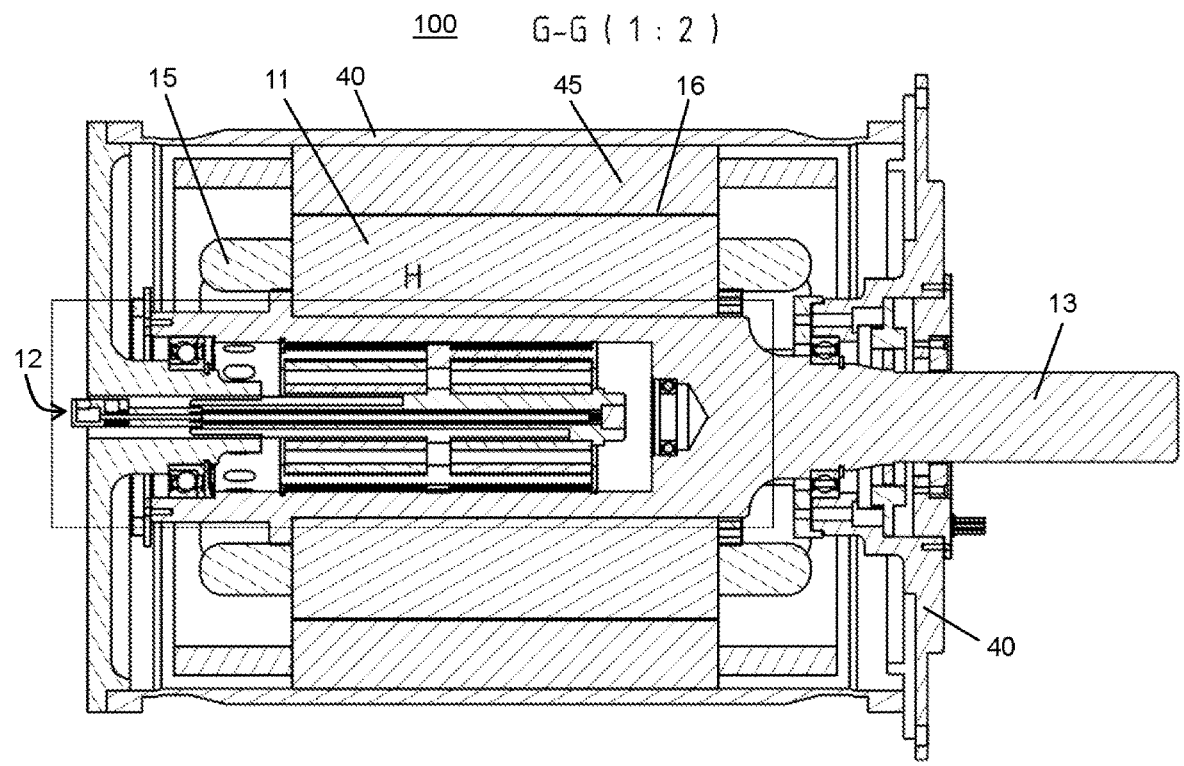
FIG. 5A shows a section G-G of the synchronous machine of FIG. 4A.

FIG. 5A shows a schematic sectional drawing G-G of the electrically excited synchronous machine 100 of FIG. 4A. In addition to a detail H shown enlarged in FIG. 5B, which includes the exciter device 30 of the synchronous machine 100, the synchronous machine 100 has in particular a rotor winding 15, a laminated core 11 of the synchronous machine rotor, and a synchronous machine stator 40 with a stator winding 45. The laminated core 11 is separated or spaced apart from the stator winding 45 by an air gap 16.

Figure 5B:
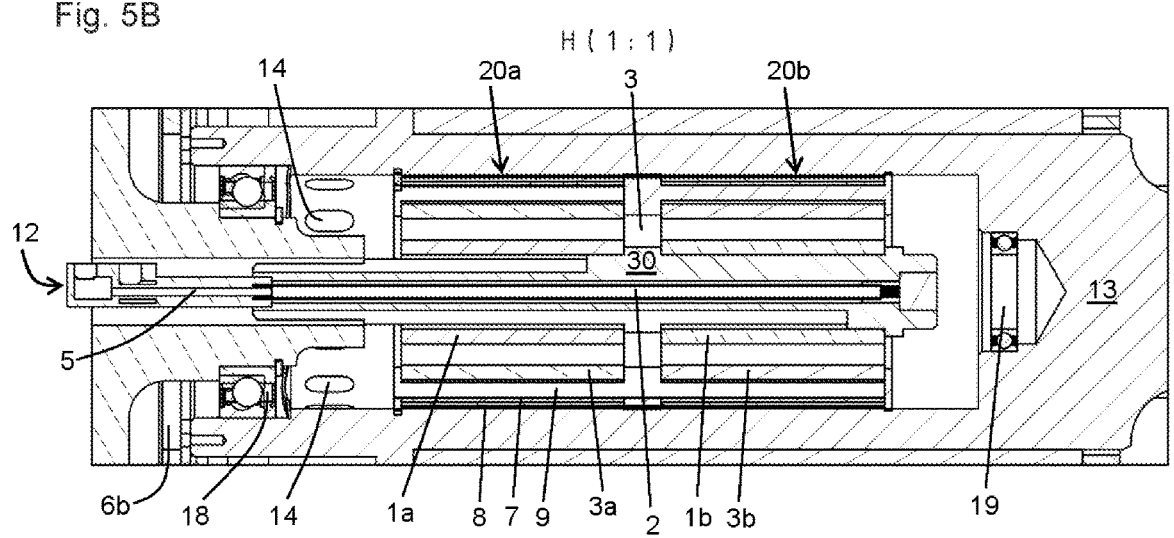
FIG. 5B shows an enlarged illustration of a detail H of FIG. 5A.

FIG. 5B shows an enlarged illustration of section H of FIG. 5A. In particular, FIG. 5B shows a schematic sectional drawing of an exemplary exciter device 30 comprising two energy transfer systems 20a and 20b. Both energy transfer systems 20a and 20b are arranged in a cavity of the synchronous machine rotor shaft 13. The energy transfer systems 20a and 20b have a common exciter stator 2 and a common exciter rotor 3 (or a common carrier on which all exciter rotors, i.e. two in this example, are mounted).

The common exciter rotor 3 (or the common carrier of the exciter rotors) is connected to the synchronous machine rotor shaft 13 mechanically or in a rotatably fixed manner. The first energy transfer system 20a has a first stator winding 1a and a first rotor winding 3a. Correspondingly, the second energy transfer system 20b has a second stator winding 1b and a second rotor winding 3b. The first and second stator windings 1a and 1b are electrically separated from one another. Furthermore, the first and second rotor windings 3a and 3b are also electrically separated from one another. The secondary-side electronics device 6b of the exciter device 30 is preferably configured to control all energy transfer systems, in the example shown here the first energy transfer system 20a and the second energy transfer system 20a, as well as any existing data transmission systems. The secondary-side electronics device 6b is arranged on the synchronous machine rotor shaft 13, but outside the cavity of the synchronous machine rotor shaft 13 (in which the energy transfer systems 20a and 20b are located). In this way, the temperature in the cavity of the synchronous machine rotor shaft 13 can be kept as low as possible. To connect the secondary-side electronics device 6b to the transmission systems, the synchronous machine rotor shaft 13 has a cable bushing from the cavity of the synchronous machine rotor shaft 13 to the outside.

As already explained above, it can be advantageous to arrange an additional electrically conductive material layer 8 (in particular made of copper) at various points of the arrangement according to the invention or the synchronous machine 100 according to the invention, in particular in the region of the exciter device 30, such as e.g. at at least one active part of the energy transfer system 20a or 20b. An active part of the energy transfer system is understood to mean a part of the energy transfer system that is at least partially exposed to a magnetic field used for energy transfer. The electrical conductivity of the additional material layer 8 is greater than the electrical conductivity of the at least one active part. If the exciter stator 2 is made of steel, it is advantageous to arrange such an additional electrically conductive material layer 8 on the exciter stator 2, for example. This is because in this case undesired eddy current losses and/or thermal losses can be reduced or avoided. Alternatively or in addition, an additional electrically conductive material layer 8 can also be arranged on the exciter rotor 4 (see FIGS. 2, 3, and 6) and/or on magnetic flux-carrying elements or magnetic flux-carrying materials 7 of the synchronous machine 100 or the energy transfer systems 20a, 20b. As can be seen in FIGS. 5A and 5B, the additional electrically conductive material layer 8 lines the entire cavity of the synchronous machine rotor shaft 13.

As can also be seen in FIGS. 5A and 5B, the electrically excited synchronous machine 100 can also have an inlet and/or outlet 12 for a coolant (e.g. water), which is connected to a cooling channel 5 of the exciter stator 2. By circulation of the coolant, the exciter stator 2 can thus be actively cooled from the inside. Furthermore, as can be seen in FIG. 5B, the synchronous machine rotor shaft 13 can have several openings or air holes 14 for cooling the exciter device 30 or the energy transfer systems 20a and 20b with air. Furthermore, a mounting of the exciter device 30 in the synchronous machine rotor shaft 13 with the aid of bearings 18 and 19 can be seen in FIG. 5B.

Figure 6:
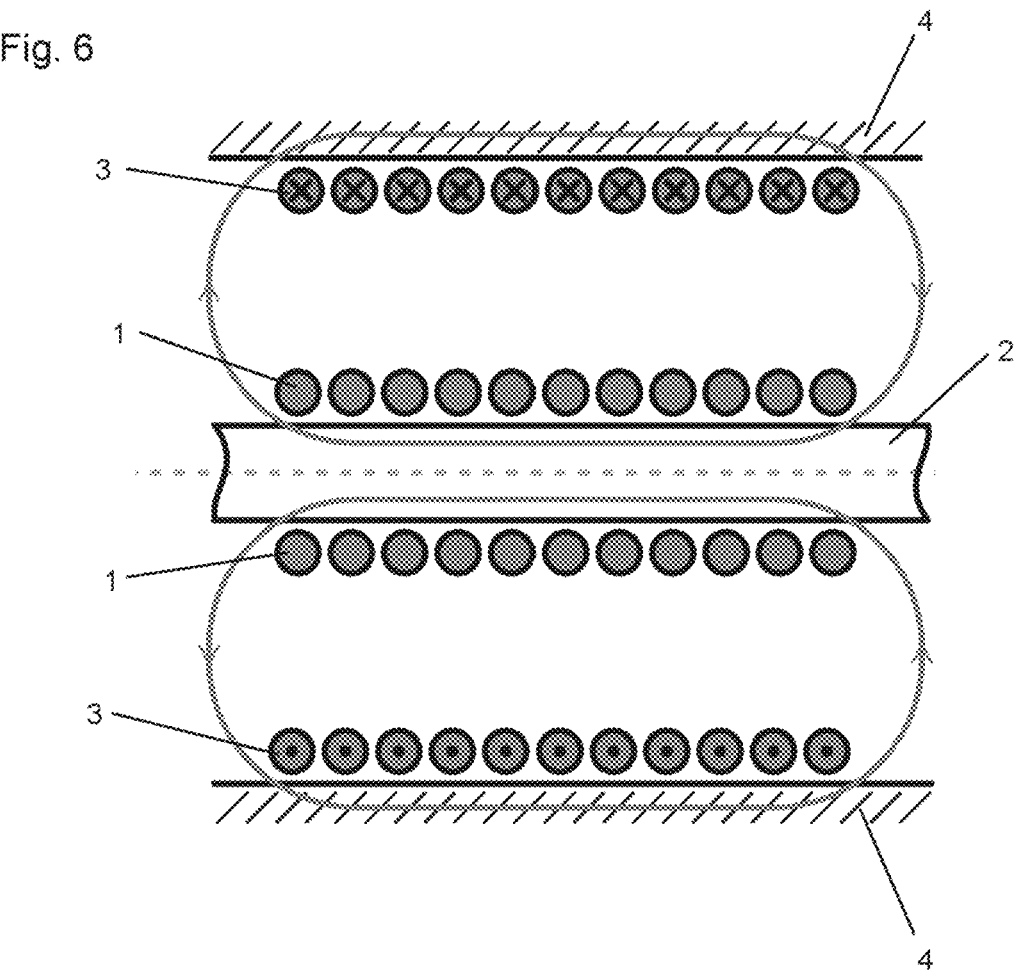
FIG. 6 shows a schematic drawing of the principle of an inductive energy transfer path that is integrated or can be integrated into the synchronous machine rotor.

FIG. 6 shows a schematic drawing of the principle of an inductive energy transfer path 20 integrated or integrable in the synchronous machine rotor or a synchronous machine rotor hollow shaft 13. In particular, FIG. 6 shows an exemplary winding arrangement of stator winding 1 and rotor winding 3 of the energy transfer system 20 for generating a magnetic field used for energy transfer. The winding scheme is basically freely selectable. FIG. 6 shows a particularly advantageous embodiment for a thin, elongated installation space, such as is present e.g. within a rotor. The closed lines with the arrows indicate the magnetic flux.

FIG. 7 shows a schematic drawing of an electrically excited machine 100 with a circuit according to a preferred embodiment of the present invention. The electrically excited machine 100 comprises a machine stator 40 with a stator winding 45 or stator windings 45a, 45b and 45c, as well as a machine rotor 10 with a rotor winding 15. In the machine rotor 10 or in a cavity of the machine rotor 10 there is arranged an energy transfer system 20 or a coil system 28 of the energy transfer system 20. The energy transfer system 20 together with an inverter 24, an optional primary-side reactive power compensation circuit 25, a rectifier 26, and an optional secondary-side reactive power compensation circuit 27 form an exciter device 30 for the electrical excitation of the machine 100. The inverter 24 together with the optional primary-side reactive power compensation circuit 25 form a primary-side electronics device 6a. The rectifier 26 together with the optional secondary-side reactive power compensation circuit 27 form a secondary-side electronics device 6b. The rectifier 26, preferably an active rectifier, is connected to the rotor winding 15 of the machine 100 so that the rotor winding 15 can be supplied with a direct voltage or a direct current. The inverter 24 (single-phase), preferably a full-bridge inverter, is connected to a battery 54. The battery 54 serves as an energy source and/or as an energy storage. The battery 54 is also connected to a converter 52 for controlling the electrically excited machine 100, for example a 3-phase converter. The converter 52 is also connected to the stator winding 45 or the stator windings 45a, 45b and 45c of the machine 100. As shown in the example of FIG. 7, the inverter 24 can be combined with a primary-side compensation circuit 25 for the energy transfer system 20. Correspondingly, the rectifier 26 can be combined with a secondary-side compensation circuit 27 for the energy transfer system 20. The inverter or converter 52 for the electrically excited machine 100 can be operated at an operating frequency A, while the inverter 26 for the energy transfer system 20 can be operated at an operating frequency B. The operating frequencies A and B can differ, which is usually the case. The operating frequency of the inverter 26 for the energy transfer system 20 is therefore independent of the speed of the machine 100.

Thus, the arrangement according to the invention serves in particular for rotor excitation of an electrical machine 100 in order to build up a static magnetic field and thus to cause a rotation of the machine rotor 10. With the aid of the arrangement according to the invention, in particular all four quadrants of an electrical machine as a motor and generator can be controlled without external forces. In other words, four-quadrant operation is possible with the arrangement described here. The electrical machine 100, which is excited with the aid of the exciter device 30, can therefore in particular be used both as a motor and as a generator. The coil system 28 is preferably single-phase and its operating frequency is independent of the speed of the machine 100.

Even if a three-phase machine is shown in FIG. 7, it goes without saying that the machine 100 can also have more than three phases, for example five phases.

FIG. 8 shows an equivalent circuit diagram of an exciter device 30 according to a preferred embodiment of the present invention. The exciter device 30 comprises an energy transfer system with a coil system 28, with one coil of the coil system 28 belonging to a stationary primary side or a stationary primary system 2 of the exciter device 30 and another coil of the coil system 28 belonging to a rotatable primary side or a rotatable secondary system 4 of the exciter device 30. The primary system 2 comprises a voltage source 54, an inverter 24, and a primary-side compensation unit 25. The secondary system 2 comprises a secondary-side compensation unit 27 and a rectifier 26. In the embodiment shown, the inverter 24 and the primary-side compensation unit 25 form the primary-side electronics device 6a. Alternatively (not shown here), the energy or voltage source 54 can also be part of the primary-side electronics device 6a. Furthermore, in the embodiment shown, the secondary-side compensation unit 27 and the rectifier 26 form the secondary-side electronics device 6b. The rectifier 26 is connected to the rotor winding or rotor coil 15 of the electrically excited machine 100.

In particular, the rotating energy transfer system 20, of which the coil system 28 is located in the cavity of the machine rotor 10, has the electrical single-phase structure shown in FIG. 8. The coil system 28 is located inside the cavity of the machine 100 or the machine rotor 10. The compensation unit can respectively be arranged together with the inverter or rectifier on a circuit board. The circuit board of the rectifier 26 is preferably arranged outside the cavity of the machine rotor 10. It is preferably an active design of the rectifier 26.

Figure 9A:
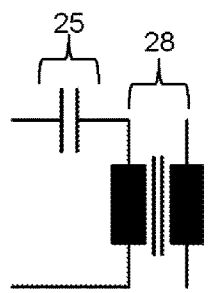
FIGS. 9A-9E shows various circuits for a primary-side compensation of a coil system.
Figure 9B:
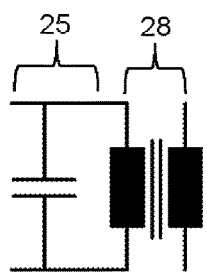
Figure 9C:
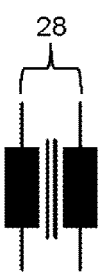
Figure 9D:
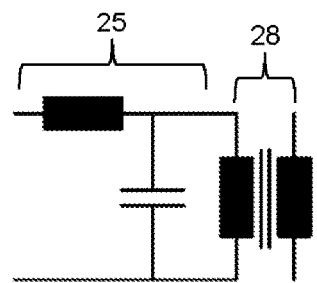
Figure 9E:
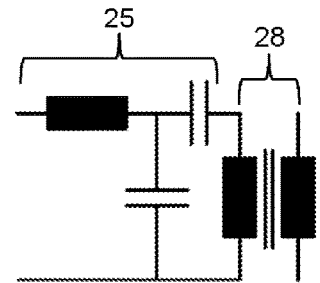

The compensation can take various forms. FIGS. 9A-9E show exemplary various circuits for primary-side compensation of the coil system 28. In particular, FIG. 9A shows a serial circuit, FIG. 9B shows a parallel circuit, FIG. 9C shows an uncompensated circuit, FIG. 9D shows an LC circuit, and FIG. 9E shows an LCC circuit. A resonant circuit is preferably used for the exciter device or the energy transfer system, which is compensated serially on the primary side and in parallel on the secondary side. In a further embodiment, the circuit can be compensated serially on the primary side and uncompensated on the secondary side. And in a further embodiment, the circuit can be non-resonant and uncompensated on both sides.

In summary, the present invention provides in particular a new solution for the construction of an electrically excited synchronous machine, the electrical energy transfer to the rotor preferably being carried out without contact. In particular, the energy transfer system is integrated into the hollow rotor shaft of the electrical machine. The hollow shaft of the machine rotor can also be lined with a highly electrically conductive material in order to minimize losses when using an inductively contactless transfer system, in particular in the high-frequency range. The transmission system is advantageously wear-free and a motor can take up less space (especially in the axial area). Furthermore, the electrically excited synchronous machine described in the context of the present invention offers a higher level of reliability and less heat development compared to conventional electrically excited synchronous machines, without the power density suffering thereby. One possible application of the present invention is e.g. in the field of electromobility.

REFERENCE NUMERAL LIST 1 stator winding of the energy transfer system
2 stationary primary system or stator of the energy transfer system (exciter stator)
3 rotor winding of the energy transfer system 4 rotatable secondary system or rotor of the energy transfer system (exciter rotor)
5 cooling channel
6 electronics device
6a primary-side electronics device (electronics board)
6b secondary-side electronics device (electronics board)
7 magnetic flux-carrying material
8 additional electrically conductive material layer
9 plastics
10 machine rotor
11 laminated core of the machine rotor
12 inlet and outlet for coolant
13 machine rotor shaft
14 opening/air hole
15 rotor winding of the machine (exciter winding)
16 air gap
17 magnetic flux carrier element of the machine rotor
18 bearing
19 bearing
20 energy transfer system
20a first energy transfer system
20b second energy transfer system
22 air gap
24 inverter for the energy transfer system
25 primary-side compensation unit
26 rectifier for the energy transfer system
27 secondary-side compensation unit
28 coil system
30 exciter device
40 machine stator
42 grooves
45 stator winding of the machine
47 magnetic flux carrier element of the machine stator
50 cover
52 inverter for the electrically excited machine
54 energy or voltage source (battery)
60 adhesive
62 plastic holder with integrated flow-carrying material
64 recess
66 plastic cover
68 bandage
70 return element for the winding of the exciter stator
100 electrically excited machines

The invention claimed is:

1. An arrangement for an electrically excited machine, the arrangement comprising:
a machine rotor; and
an exciter device for the electrical excitation of the machine, wherein the exciter device comprises at least one energy transfer system configured for contactless transfer of electrical energy,
wherein the at least one energy transfer system is arranged inside the machine rotor as an encapsulated system, and wherein an operating frequency of the at least one energy transfer system is independent of a speed of the electrically excited machine,
wherein the at least one energy transfer system comprises a primary side and a secondary side arranged concentrically around an axis of rotation of the machine rotor, and
wherein the primary side is located inside the secondary side.

2. The arrangement according to claim 1, wherein the machine rotor has a machine rotor shaft and the at least one energy transfer system of the exciter device is arranged inside a cavity of the machine rotor shaft.

3. The arrangement according to claim 2, wherein the machine rotor shaft has at least one opening for cooling the at least one energy transfer system.

4. The arrangement according to claim 1,
wherein the at least one energy transfer system of the exciter device comprises a rotating energy transfer device that is an external rotor; and/or
wherein the at least one energy transfer system of the exciter device comprises an exciter stator and an exciter rotor, wherein the exciter stator is made of a magnetically as well as electrically non-conductive material, and wherein the exciter stator has a bore for cooling.

5. The arrangement according to claim 4, wherein the at least one energy transfer system is arranged inside the machine rotor such that the exciter rotor is connected to the machine rotor in a rotatably fixed manner.

6. The arrangement according to claim 1, wherein the machine rotor has an exciter winding, and wherein the exciter device is configured to transfer, in a contactless manner, electrical energy from the primary side of the at least one energy transfer system to the secondary side of the at least one energy transfer system, and then from the secondary side of the at least one energy transfer system to the exciter winding of the machine rotor.

7. The arrangement according to claim 1, wherein the exciter device further comprises a primary-side electronics device with an inverter and/or a secondary-side electronics device with a rectifier, wherein the primary-side electronics device further has a primary-side compensation unit, wherein the secondary-side electronics device further has a secondary-side compensation unit, and wherein the secondary-side electronics device is arranged on and/or outside a machine rotor shaft of the machine rotor.

8. The arrangement according to claim 1, wherein the arrangement further comprises an energy source and/or a converter for controlling the electrically excited machine.

9. The arrangement according to claim 1, wherein the electrically excited machine with the exciter device can be used as both a motor and as a generator without being controlled by external forces.

10. The arrangement according to claim 1,
wherein the exciter device comprises two or more energy transfer systems; and/or
wherein the exciter device further comprises at least one data transmission system, which is integrated inside the machine rotor.

11. The arrangement according to claim 1, wherein an additional electrically conductive material layer is arranged on at least one active part of the energy transfer system, wherein an active part of the energy transfer system is part of the energy transfer system which is at least partially exposed to a magnetic field used for energy transfer, and wherein an electrical conductivity of the additional material layer is greater than the electrical conductivity of the at least one active part.

12. The arrangement according to claim 11, wherein the additional electrically conductive material layer is arranged on a coil system of the at least one energy transfer system in the region of electrically poorly conductive and at the same time magnetically conductive materials, or in the region of electrically poorly conductive and at the same time magnetically non-conductive materials.

13. The arrangement according to claim 1, wherein the at least one energy transfer system has a stator made of an electrically non-conductive material and/or a magnetically non-conductive material.

14. An electrically excited machine, comprising:
a machine stator;
a machine rotor; and
an exciter device for the electrical excitation of the machine,
wherein the exciter device comprises at least one energy transfer system configured for contactless transfer of electrical energy, and wherein the at least one energy transfer system is arranged as an encapsulated system inside the machine rotor,
wherein the at least one energy transfer system comprises a primary side and a secondary side arranged concentrically around an axis of rotation of the machine rotor, and wherein the primary side is located inside the secondary side, and
wherein an operating frequency of the at least one energy transfer system is independent of a speed of the electrically excited machine.

15. An electrically excited machine, comprising:
a machine rotor; and
an exciter device comprising at least one energy transfer system configured for contactless transfer of electrical energy, wherein the at least one energy transfer system, including contactless power transfer components thereof, is arranged inside a cavity of the machine rotor as an encapsulated system, wherein an operating frequency of the at least one energy transfer system is independent of an operating frequency of the electrically excited machine, and wherein the electrically excited machine with the exciter device can operate as both a motor and as a generator, and
wherein the at least one energy transfer system comprises a primary side and a secondary side arranged concentrically around an axis of rotation of the machine rotor, and wherein the primary side is located inside the secondary side.

16. The electrically excited machine of claim 15, wherein the contactless power transfer components of the at least one energy transfer system comprise an exciter stator and an exciter rotor that are each arranged inside the cavity of the machine rotor.

17. The electrically excited machine of claim 15, wherein the contactless power transfer components of the at least one energy transfer system comprise a coil system, the primary side, and the secondary side that are each arranged inside the cavity of the machine rotor.

* * * * *